United States Patent
Suh

(10) Patent No.: US 7,865,921 B2
(45) Date of Patent: Jan. 4, 2011

(54) APPARATUS FOR RECORDING/REPRODUCING DIGITAL BROADCAST AND METHOD OF BROWSING RECORD INFORMATION THEREOF

(75) Inventor: Jong Yeul Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 1145 days.

(21) Appl. No.: 11/345,289

(22) Filed: Feb. 2, 2006

(65) Prior Publication Data

US 2006/0171679 A1    Aug. 3, 2006

(30) Foreign Application Priority Data

Feb. 2, 2005    (KR)    ...................... 10-2005-0009669

(51) Int. Cl.
*H04N 5/445* (2006.01)
*H04N 5/91* (2006.01)

(52) U.S. Cl. .............................. 725/47; 725/40; 725/55; 725/56; 725/58; 725/61; 386/83

(58) Field of Classification Search .................... 386/46, 386/83, 124–126; 725/37–41, 43, 44, 47, 725/55, 56, 58, 61
See application file for complete search history.

(56) References Cited

U.S. PATENT DOCUMENTS

| 2002/0124256 A1* | 9/2002 | Suzuka ........................ 725/55 |
| 2003/0016304 A1* | 1/2003 | Norsworthy et al. ........ 348/565 |

* cited by examiner

*Primary Examiner*—Thai Tran
*Assistant Examiner*—Mishawn Dunn
(74) *Attorney, Agent, or Firm*—Birch, Stewart, Kolasch & Birch, LLP

(57) ABSTRACT

An apparatus for recording/reproducing a digital broadcast and method thereof are disclosed, by which a user is provided with record information for the corresponding program and by which a data structure enabling an implicative representation of a recorded broadcast stream is proposed. The present invention includes a storage unit having at least one storage medium storing a broadcast program, the storage unit generating a record information file including at least one sub-record information having a display level assigned thereto by a broadcast program unit, the storage unit storing the generated record information file in the corresponding storage medium and a control unit reading the sub-record information to which the display level meeting an inputted display mode is assigned from the corresponding record information file if a display mode condition is inputted together with a record information browsing command, the control unit displaying the read sub-record information.

25 Claims, 6 Drawing Sheets

| Data classification | Level |
|---|---|
| Program title(read only) | 0 |
| Record date(read only) | 1 |
| Record volume(reda only) | 1 |
| Final play time | 2 |
| Thumbnail image (read only) | 2 |
| User input information | 2 |

FIG. 2

| Data classification | Level |
|---|---|
| Program title(read only) | 0 |
| Record date(read only) | 1 |
| Record volume(reda only) | 1 |
| Final play time | 2 |
| Thumbnail image (read only) | 2 |
| User input information | 2 |

FIG. 3C

Title for program A

Thumbnail#1 .... Thumbnail #n
Record date A
Volume A
Final play time A

User input information

APPARATUS FOR RECORDING/REPRODUCING DIGITAL BROADCAST AND METHOD OF BROWSING RECORD INFORMATION THEREOF

This application claims the benefit of the Korean Patent Application No. 10-2005-0009669, filed on Feb. 2, 2005, which is hereby incorporated by reference as if fully set forth herein.

BACKGROUND OF THE INVENTION

1. Field of the Invention

The present invention relates to a digital broadcast record and reproduction, and more particularly, to an apparatus for recording/reproducing a digital broadcast and method of browsing record information thereof. Although the present invention is suitable for a wide scope of applications, it is particularly suitable for facilitating to search information about a program recorded in a storage medium.

2. Discussion of the Related Art

Generally, a personal video recorder (hereinafter abbreviated PVR) is a device capable of recording and reproducing a digital broadcast.

The PVR provides a supplementary convenience to a viewer by applying a hard disc drive (HDD) to a digital broadcast receiver. The PVR provides a time-shift function, an instant replay function and various trick play functions as well as a function of recording a digital broadcast in a storage medium. So, the PVR provides functions more enhanced than those of a conventional VCR (video cassette recorder) Besides, the PVR is advantageous in that an HD digital broadcast can be stored in a storage medium to be viewed at any time and is also provided with various supplementary service functions.

However, the related art PVR is lack of a summary function enabling a user to recognize information of a program at a glance. In most cases, summary information about a stored program is provided as a record list to a user. And, the record list is a simple list configured with such information including titles, channels and record volumes of recorded programs and the like.

Hence, the information quantity of the record list is insufficient for a user to grasp contents of a corresponding program in detail until the user views the corresponding program.

SUMMARY OF THE INVENTION

Accordingly, the present invention is directed to an apparatus for recording/reproducing a digital broadcast and method of browsing record information thereof that substantially obviate one or more problems due to limitations and disadvantages of the related art.

An object of the present invention is to provide an apparatus for recording/reproducing a digital broadcast and method of browsing record information thereof, by which details of broadcast information recorded in a storage medium can be quickly searched.

Another object of the present invention is to provide an apparatus for recording/reproducing a digital broadcast and method of browsing record information thereof, by which record information can be quickly searched in a manner of enabling a conditional search of broadcast information recorded in a storage medium.

A further object of the present invention is to provide an apparatus for recording/reproducing a digital broadcast and method of browsing record information thereof, in which a plurality of storage media are provided and by which information about broadcast information recorded in each of the storage media can be quickly searched in detail.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for recording/reproducing a digital broadcast according to the present invention includes a storage unit having at least one storage medium storing a broadcast program, the storage unit generating a record information file including at least one sub-record information having a display level assigned thereto by a broadcast program unit, the storage unit storing the generated record information file in the corresponding storage medium, a control unit reading the sub-record information with the same display level as an inputted display mode is assigned from the corresponding record information file if a display mode condition is inputted together with a record information browsing command, and the control unit displaying the read sub-record information.

Preferably, if the inputted display mode condition is the display mode of '0', the control unit reads the sub-record information corresponding to the display level of '0' from the record information file of the at least one storage medium within the storage unit and then displays the read sub-record information.

Preferably, if the inputted display mode condition is the display mode of '1', the control unit reads the sub-record information corresponding to the display level of '0' or '1' from the record information file of the at least one storage medium within the storage unit and then displays the read sub-record information.

Preferably, if the inputted display mode condition is the display mode of '1', the control unit reads the sub-record information corresponding to the display level of '0' or '1' from the record information file of the storage medium selected from the storage unit and then displays the read sub-record information.

More preferably, if a specific program is selected from the displayed sub-record information, the control unit reads the sub-record information corresponding to the display level of '0', '1' or '2' from the record information file of the selected program and then displays the read sub-record information.

Preferably, if the inputted display mode condition is a slide show mode of '1', the control unit reads record information from the record information file of the at least one storage medium within the storage unit and then displays the read record information in a slide show type.

More Preferably, the record information is the sub-record information corresponding to the display level of '0' or '1' and a slide show unit is the storage medium.

Preferably, if the inputted display mode condition is a slide show mode of '2', the control unit reads record information from the record information file of the storage medium selected from the storage unit and then displays the read record information in a slide show type.

More preferably, the record information is the sub-record information corresponding to the display level of '0' or '1' and wherein a slide show unit is the broadcast program unit.

Preferably, the at least one storage medium comprises a hard disc drive (HDD).

In another aspect of the present invention, a method of browsing record information in a digital broadcast recording/reproducing apparatus having at least one storage medium storing a broadcast program includes a step (a) of generating a record information file including at least one sub-record information having a display level assigned thereto by a broadcast program unit stored in the at least one storage medium and storing the generated record information file in the corresponding storage medium and a step (b) of if a display mode condition is inputted together with a record information browsing command, reading the sub-record information to which the display level meeting an inputted display mode is assigned from the corresponding record information file and displaying the read sub-record information.

Preferably, in the step (b), if the inputted display mode condition is the display mode of '0', the sub-record information corresponding to the display level of '0' is read from the record information file of the at least one storage medium to be displayed in a scroll type on a portion of a screen.

Preferably, in the step (b), if the inputted display mode condition is the display mode of '1', the sub-record information corresponding to the display level of '0' or '1' is read from the record information file of the at least one storage medium or a selected storage medium to be displayed.

Preferably, in the step (b), if a specific program is selected from the displayed sub-record information, the sub-record information corresponding to the display level of '0', '1' or '2' is read from the record information file of the selected program to be displayed.

In a further aspect of the present invention, a method of browsing record information in a digital broadcast recording/reproducing apparatus having at least one storage medium storing a broadcast program includes a step (a) of generating a record information file including at least one sub-record information having a display level assigned thereto by a broadcast program unit stored in the at least one storage medium and storing the generated record information file in the corresponding storage medium and a step (b) of if a slide show mode condition is inputted together with a record information browsing command, reading the sub-record information to which the display level meeting an inputted display mode is assigned from the corresponding record information file and displaying the read sub-record information in a slide show type.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram of a data configuration of CDF to be used for record list browsing in an apparatus for recording/reproducing a digital broadcast according to one embodiment of the present invention;

FIG. 3C is a diagram of a screen for explaining a method of displaying a record list according to one embodiment of the present invention in case that a display mode value is '2';

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In the present invention, a variety of record information is configured in a file format to identify broadcast programs recorded in a storage medium and the record information stored in the storage medium can be quickly and efficiently searched using the corresponding file. For instance, the file includes supplementary information of a recorded program such as a title, a record time and a record volume, a user input message, a thumbnail image and the like.

In particular, the present invention enables the record information recorded in each storage medium to be quickly and efficiently searched using the file in a digital broadcast recording/reproducing apparatus having a plurality of storage media.

Figure 1:
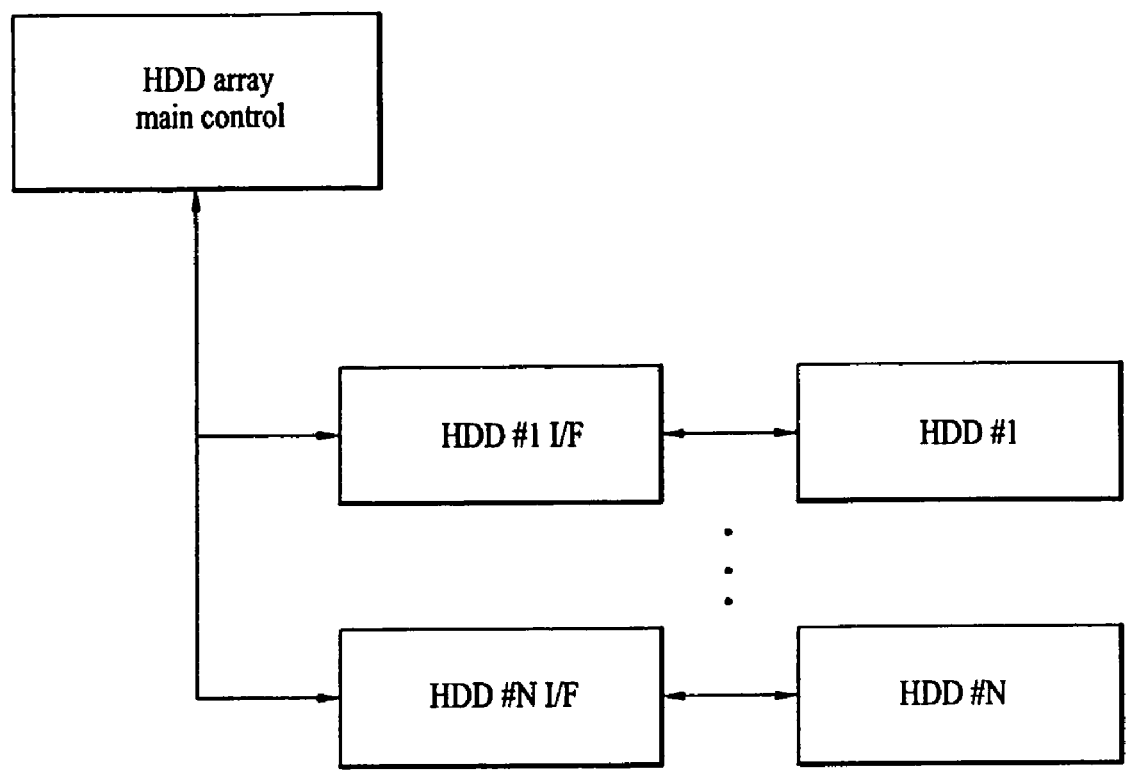
FIG. 1 is a conceptional diagram of an apparatus for recording/reproducing a digital broadcast according to one embodiment of the present invention.

FIG. 1 is a conceptional diagram of an apparatus for recording/reproducing a digital broadcast according to one embodiment of the present invention.

Referring to FIG. 1, N digital storage media (e.g., HDD) are connected to a control unit via interfaces HDD#1 I/F~HDD#N I/F, respectively. Namely, FIG. 1 shows a digital broadcast recording/reproducing apparatus having an HDD (hard disc) array or a hard disc rack provided with several HDDs.

Each of the interfaces shown in FIG. 1 is in charge of parts associated with data input/output of the corresponding HDD. And, the control unit controls data inputs/outputs of the N HDDs overall.

In order to browse information of each program recorded in the N HDDs effectively, the present invention employs a concept of CDF (contents description file). In particular, the record information in various formats is configured in a CDF format to identify the broadcast programs recorded in the HDD. In this case, the CDF is defined as a file that represents identification information of the program stored in the HDD installed at the digital broadcast recording/reproducing apparatus. For instance, the CDF includes supplementary information of a recorded program such as a title, a record time and a record volume, a user input message, a thumbnail image and the like.

In this case, each of the HDDs should independently store the CDF for the program stored in the corresponding HDD.

For instance, assuming that two HDDs are provided, that two programs are recorded in one of the HDDs and that five programs are recorded in the other, the former HDD stores two CDFs together with the corresponding programs and the latter HDD stores five CDFs together with the corresponding programs.

Hence, the control unit performs a control function in a manner that suitable data can be brought from the corresponding HDD in performing a multi-download or multi-upload function. And, the control unit performs a quick browsing function in a manner of deciding information to be displayed on an OSD (on screen display) by reading suitable information from the CDFs stored in the HDDs, respectively.

FIG. 2 is a diagram of a data configuration of CDF to be used for record list browsing in an apparatus for recording/reproducing a digital broadcast according to one embodiment of the present invention.

Referring to FIG. 2, a CDF of each recorded program includes a program title, a record date, a record volume, a final play time, a thumbnail image, a user input information and the like. In this case, a suitable level value is assigned to each item, which is a conditional value for deciding whether to output corresponding information according to a browsing method for a record list. A display using the level value will be explained in detail later.

In case of the program title in FIG. 2, information acquired through EPG (electronic program guide) data is reflected on the CDF as it is. Genre information, player information and the like can be included in the information that can be acquired from the EPG as well as the title.

The record data, record volume and the like are recorded in a manner that the digital broadcast recording/reproducing apparatus records time information for a corresponding timing point in the CDF of the corresponding program.

The final play time is information that is updated each time the corresponding program is accessed.

At least one thumbnail image can be generated for one program and is automatically extracted in performing a recording job of the corresponding program. In this case, since the thumbnail image has the largest volume among data included in the CDF, the number of thumbnail images to be included in the CDK can be limited according to an option of a system.

A data format of the thumbnail image is a format of Y/Cb/Cr or RGB converted from Y/Cb/Cr. In case that the thumbnail image is stored in the RGB format, it is advantageous in that the corresponding thumbnail image needs not to be converted in the transmission to an OSD bitmap for display. Yet, it is disadvantageous in that a time for storing the thumbnail image is elongated since the data acquired in the Y/Cb/Cr format should be converted to the RGB format.

The user input information is the data that a user directly inputs additional information, remark or special items for the corresponding program in a format of text. And, the user input information can be utilized as information for facility of a future browsing or identification of the corresponding program.

Figure 3A:
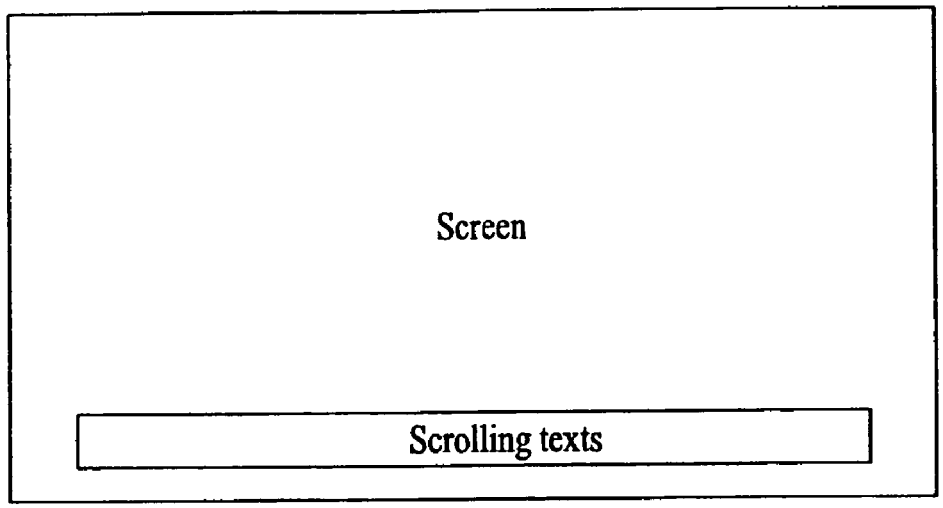
FIG. 3A is a diagram of a screen for explaining a method of displaying a record list according to one embodiment of the present invention in case that a display mode value is '0'.
Figure 3B:
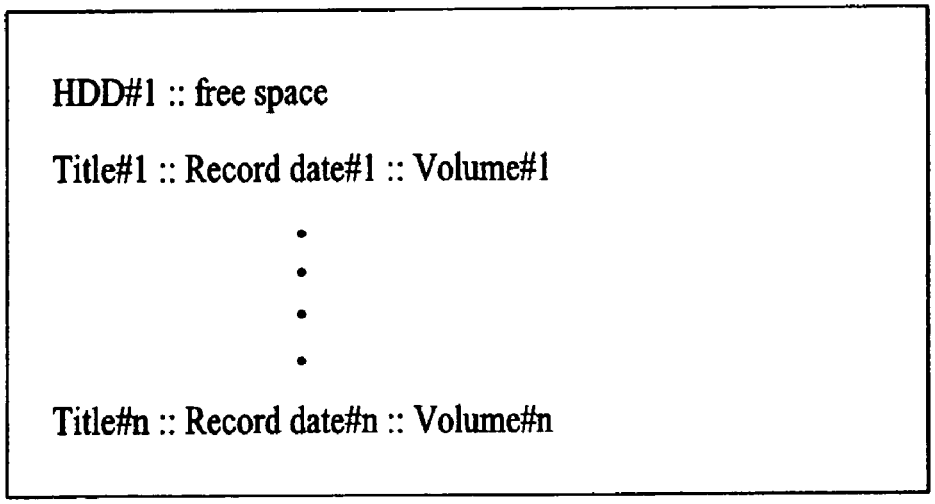
FIG. 3B is a diagram of a screen for explaining a method of displaying a record list according to one embodiment of the present invention in case that a display mode value is '1'.

FIGS. 3A to 3C show that record information read from CDF according to a value of a display mode is displayed.

FIG. 3A is a diagram of a screen for explaining a method of displaying a record list according to one embodiment of the present invention in case that a display mode value is '0'.

Referring to FIG. 3A, information, of which level value is '0' if a display mode is '0', is displayed.

In particular, record information, of which level value is '0' in CDF if a display mode value is '0', i.e., a program title is outputted. In this case, record information stored in an HDD together with a currently viewed or played program can be browsed.

In case that there is at least one record program stored in an HDD, a character sequence representing a title of a program recorded in an HDD can be scrolled on a lower bottom of a screen. If a digital broadcast recording/reproducing apparatus is provided with a plurality of HDDs, titles of programs recorded in the entire HDDs can be scrolled as well.

In particular, the outputted or scrolled information can be the record information for the HDD to be currently viewed or for the entire HDDs.

FIG. 3B is a diagram of a screen for explaining a method of displaying a record list according to one embodiment of the present invention in case that a display mode value is '1'.

Referring to FIG. 3B, information outputted from a CDF is data corresponding to level '0' or '1' within the CDF. Record information corresponding to level '0' or '1' for all programs stored in a currently selected HDD or all HDDs is outputted. With reference to FIG. 2, the record information, which is outputted from each CDF in case that a display mode is '1', is the information about a title, record data and record volume of a corresponding program. And, information about a free (remaining) space in a corresponding HDD can be outputted.

FIG. 3C is a diagram of a screen for explaining a method of displaying a record list according to one embodiment of the present invention in case that a display mode value is '2'.

Referring to FIG. 3C, a display mode '2' should be entered through a display mode '1'. For instance, if a specific program is selected from record information outputted in case of the display mode '1', detailed information about the corresponding program is outputted. And, this becomes the display mode '2'. In this embodiment of the present invention, a thumbnail image, a final play time, a user input sentence and the like for the program selected in case of the display mode '2' are additionally outputted from a corresponding CDF.

Figure 4:
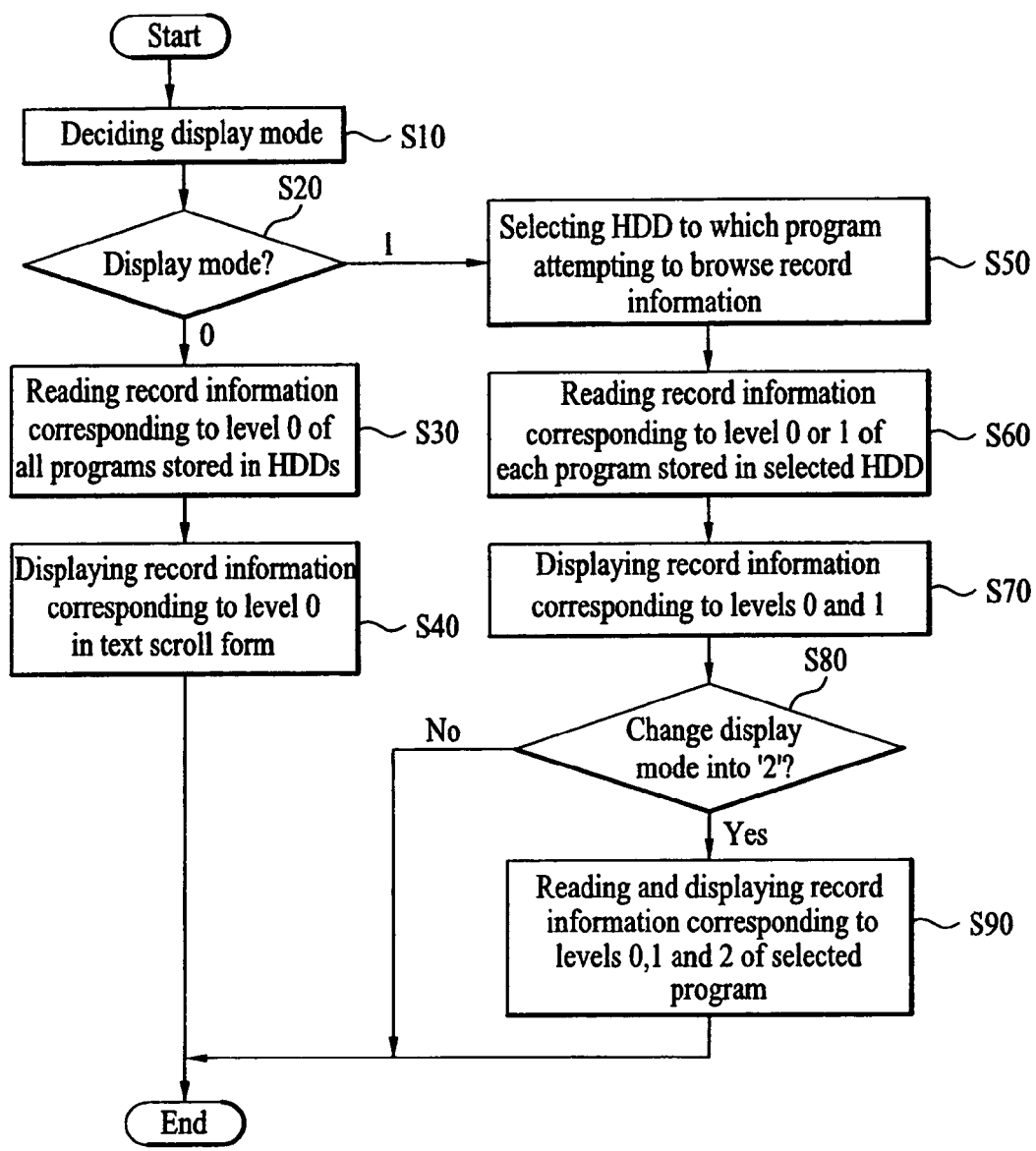
FIG. 4 is a flowchart of a method of outputting record information according to a display mode using CDF according to the present invention.

FIG. 4 is a flowchart of a method of outputting record information according to a display mode using CDF according to the present invention.

Referring to FIG. 4, a user inputs a browsing command and method (i.e., display mode and decision of HDD to be browsed) for record information (S10). If so, a digital broadcast recording/reproducing apparatus of the present invention reads the corresponding record information from a CDF according to a set display mode and then outputs the corresponding information.

In particular, a control unit of the digital broadcast recording/reproducing apparatus decides whether a display mode set by a user is '0' or '1' (S20). For instance, in case of a display mode '2', a user is allowed to select it through a display mode '1'.

If the display mode is set to '0' in the step S20 and if an output target is entire programs recorded in the digital broadcast recording/reproducing apparatus, record information (e.g., program title) of programs corresponding to a level '0' is sequentially read from M CDFs stored in N hard discs (S30). In this case, 'M' is the number of the entire recorded programs.

The read record information is converted to an OSD format and is then outputted to a display screen in a text scroll format (S40).

If the display mode is set to '0' in the step S20 and if an output target is a specific HDD, record information corresponding to a level '0' is sequentially read from L CDFs stored in the selected HDD and is then outputted to the display screen in the OSD format. In this case, 'L' is the number of programs recorded in the selected HDD. In this case, if there exist a plurality of stored programs, the read record information can be outputted in a text scroll format.

Meanwhile, if the display mode is '1' in the step S20, an HDD for browsing record information is selected (S50).

Subsequently, all record information corresponding to level '0' or '1' is sequentially read from L CDFs stored in the selected HDD (S60) and is then outputted to the display screen (S70). In this case, 'L' is the number of programs recorded in the selected HDD.

The user decides whether to change the display mode into '2' (S80). If the display mode '2' is not entered, the procedure for outputting the record information of the digital broadcast recording/reproducing apparatus is ended.

Meanwhile, if the display mode '2' is entered in the step S80, i.e., if the user inputs a command for browsing next detailed information after selecting a specific program, record information corresponding to a level '2' (or level below '2') is read from a CDF of the corresponding program and is then outputted to the display screen (S90). In this case, the record information, which corresponds to the level '0' or '1' of the selected HDD and was read in the previous step, should be separately stored. This is needed for the user to return to a previous screen after completion of browsing the detailed information of the specific program.

Besides, a menu for directly selecting to play a specific program in the display mode '1' or '2' can be additionally provided. For this, the digital broadcast recording/reproducing apparatus should retain the information for linking specific CDF information to a physical location of a corresponding program.

Figure 5:
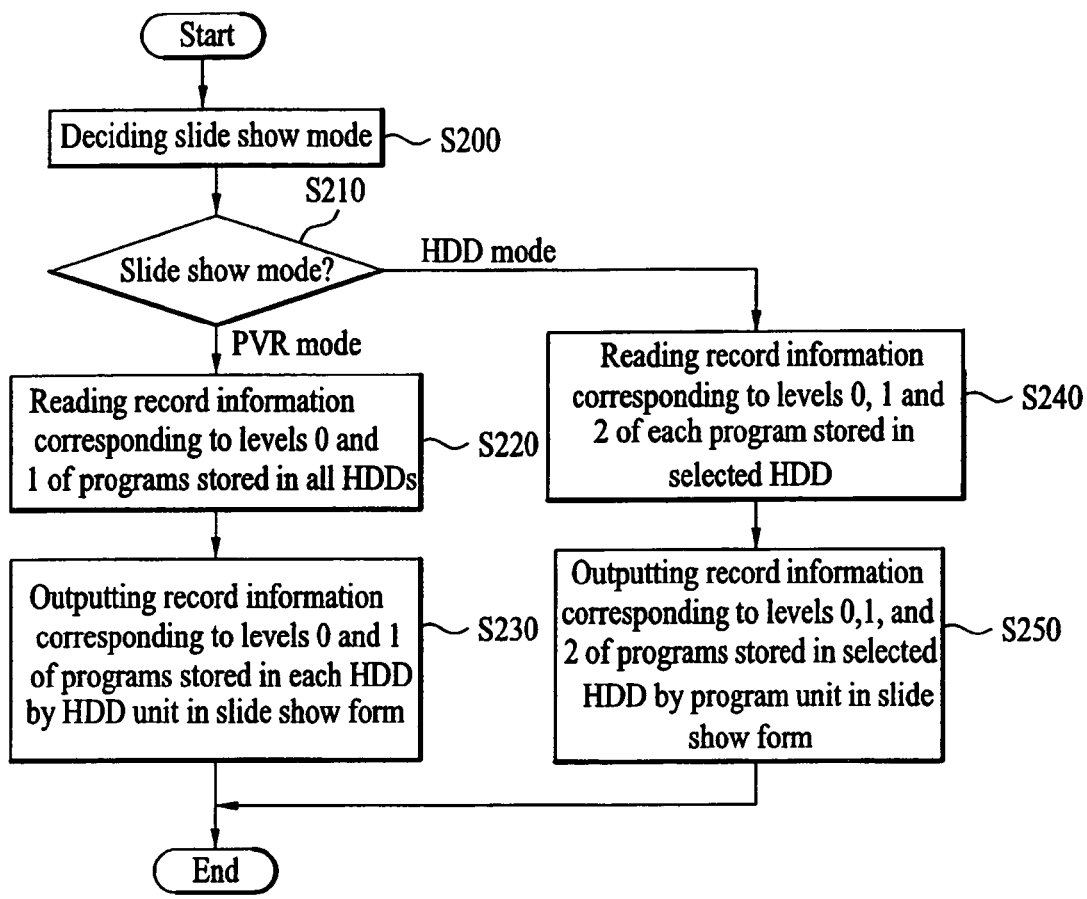
FIG. 5 is a flowchart of a slide show function implementation for a recorded program using CDF according to one embodiment of the present invention.

FIG. 5 is a flowchart of a slide show function implementation for a recorded program using a CDF according to one embodiment of the present invention, in which record information is displayed using a CDF in a digital broadcast recording/reproducing apparatus according to the present invention.

Referring to FIG. 5, the present invention can provide record information of a program in a form of a slide show. In this case, the slide show can be provided in two types which are named a PVR mode (first mode) and an HDD mode (second mode) for convenience of explanation, respectively.

The PVR mode is applicable to all HDDs and is defined as a method of implementing information about each of the HDDs into one slide to output sequentially.

And, the HDD mode is applicable to a selected HDD and is defined as a method of implementing to output recording information of each program recorded in the selected HDD in sequence.

A user of a digital broadcast recording/reproducing apparatus according to the present invention is allowed to decide a mode of a slide show (S200).

Once the slide show mode is decided in the step S200, it is decided whether the decided mode is a PVR mode or an HDD mode (S210).

If it is decided as the PVR mode in the step S210, record information of level '0' or '1' for all programs stored in all HDDs within the digital broadcast recording/reproducing apparatus is read from a corresponding CDF (S220).

Subsequently, the record information of the level '0' and '1' for the programs stored in each of the HDDs is outputted to a display screen in a form of slide show (S230). Hence, each slide appearing in the PVR mode has the figure shown in FIG. 3B.

Meanwhile, if it is decided as the HDD mode in the step S210, record information corresponding to level '0', '1' or '2' for each program stored in the selected HDD is read (S240). And, the record information corresponding to the levels '0', '1' and '2' is outputted in a form of a slide show each individual program (S250). Hence, each slide appearing in the HDD mode has the figure shown in FIG. 3C.

Moreover, in implementing the slide show, all information to be displayed is collectively read in advance and is then displayed. Alternatively, information to be outputted in a next slide is read while one slide is displayed.

As a hard disc rack or a hard disc array is provided to a digital broadcast recording/reproducing apparatus, a corresponding storage space considerably increases. So, it is difficult for a user to memorize a number of recordable programs. The present invention classifies the record information of the recorded programs into the hard disc array or hard disc rack to represent. Hence, a user can browse a program list stored in each hard disc array or in each hard disc rack separately.

Accordingly, the present invention provides the following effects or advantages.

First of all, the present invention generates a CDF using information such as a title and a record time and a thumbnail image extracted from a video stream for a broadcast program recorded in a digital broadcast recording/reproducing apparatus having a plurality of hard discs, thereby providing a user with record information for the corresponding program and proposing a data structure enabling an implicative representation of a recorded broadcast stream.

Secondly, the present invention additionally assigns level information to decide whether to output each item configuring a CDF according to a display mode, thereby enhancing efficiency and convenience in user's browsing of a massive record list in various ways.

Thirdly, the present invention is applicable to contents summary and technology for browsing broadcast programs or multimedia streams stored in a large-scale digital broadcast recording/reproducing apparatus having a plurality of hard discs like a hard disc rack or array, a video library and the like and applied fields such as a multimedia browsing and the like, thereby providing summary information about multimedia streams to a user effectively.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for recording and reproducing a digital broadcast, comprising:
    a storage unit having at least one storage medium storing a broadcast program, the storage unit generating a record information file of the stored broadcast program including at least one sub-record information having a display level assigned thereto by a broadcast program unit, the storage unit storing the generated record information file in the corresponding storage medium,
    wherein the sub-record information includes user input information which is additional information directly inputted by a user; and
    a control unit configured to read the sub-record information with the same display level as an inputted display mode and to display the read sub-record information of the stored record information file having the same display level and with a currently played program on a screen.

2. The apparatus of claim 1, wherein the sub-record information includes at least one of a title, a record date, a record volume, a final play time and a thumbnail image and the user input information for the stored broadcast program and the display level assigned to the sub-record information.

3. The apparatus of claim 2, wherein the display level of '0' is assigned to the title for the broadcast program, wherein the display level of '1' is assigned to each of the record data and the record volume, and wherein the display level of '2' is assigned to each of the final play time and the thumbnail image.

4. The apparatus of claim 2, wherein the display level of '2' is assigned to the user input information.

5. The apparatus of claim 1, wherein if the inputted display mode condition is the display mode of '0', the control unit reads the sub-record information corresponding to the display level of '0' from the record information file of the at least one storage medium within the storage unit and then displays the read sub-record information.

6. The apparatus of claim 5, wherein the control unit scrolls to display the sub-record information corresponding to the display level of '0' on a portion of a screen.

7. The apparatus of claim 1, wherein if the inputted display mode condition is the display mode of '1', the control unit reads the sub-record information corresponding to the display level of '0' or '1' from the record information file of the at least one storage medium within the storage unit and then displays the read sub-record information.

8. The apparatus of claim 1, wherein if the inputted display mode condition is the display mode of '1', the control unit reads the sub-record information corresponding to the display level of '0' or '1' from the record information file of the storage medium selected from the storage unit and then displays the read sub-record information.

9. The apparatus of claim 7 or claim 8, wherein if a specific program is selected from the displayed sub-record information, the control unit reads the sub-record information corresponding to the display level of '0', '1' or '2' from the record information file of the selected program and then displays the read sub-record information.

10. The apparatus of claim 1, wherein if the inputted display mode condition is a slide show mode of '1', the control unit reads record information from the record information file of the at least one storage medium within the storage unit and then displays the read record information in a slide show type.

11. The apparatus of claim 1, wherein the record information is the sub-record information corresponding to the display level of '0' or '1' and wherein a slide show unit is the storage medium.

12. The apparatus of claim 1, wherein if the inputted display mode condition is a slide show mode of '2', the control unit reads record information from the record information file of the storage medium selected from the storage unit and then displays the read record information in a slide show type.

13. The apparatus of claim 12, wherein the record information is the sub-record information corresponding to the display level of '0' or '1' and wherein a slide show unit is the broadcast program unit.

14. The apparatus of claim 1, wherein the at least one storage medium comprises a hard disc drive (HDD).

15. A method of browsing record information in a digital broadcast recording and reproducing apparatus having at least one storage medium storing a broadcast program, the method comprising:

a step (a) of generating a record information file of a stored broadcast program including at least one sub-record information having a display level assigned thereto by a broadcast program unit stored in the at least one storage medium and storing the generated record information file in the corresponding storage medium, wherein the sub-record information includes user input information which is additional information directly inputted by a user; and a step (b) of reading the sub-record information with the same display level as an inputted display mode and displaying the read sub-record information, the method further comprising displaying the record information of the record information file stored in the at least one storage medium based on the display level and with a currently played program on a screen.

16. The method of claim 15, wherein the sub-record information includes at least one of a title, a record date, a record volume, a final play time and a thumbnail image for the broadcast program, wherein the display level of '0' is assigned to the title for the broadcast program, wherein the display level of '1' is assigned to each of the record data and the record volume, and wherein the display level of '2' is assigned to each of the final play time and the thumbnail image.

17. The method of claim 15, wherein the sub-record information wherein the display level of '2' is assigned to the user input information.

18. The method of claim 15, wherein in the step (b), if the inputted display mode condition is the display mode of '0', the sub-record information corresponding to the display level of '0' is read from the record information file of the at least one storage medium to be displayed in a scroll type on a portion of a screen.

19. The method of claim 15, wherein in the step (b), if the inputted display mode condition is the display mode of '1', the sub-record information corresponding to the display level of '0' or '1' is read from the record information file of the at least one storage medium or a selected storage medium to be displayed.

20. The method of claim 15, wherein in the step (b), if a specific program is selected from the displayed sub-record information, the sub-record information corresponding to the display level of '0', '1' or '2' is read from the record information file of the selected program to be displayed.

21. The method of claim 15, wherein the sub-record information includes at least one of a title, a record date, a record volume, a final play time, a thumbnail image and the user input information for the stored broadcast program and the display level assigned to the sub-record information.

22. A method of browsing record information in a digital broadcast recording and reproducing apparatus having at least one storage medium storing a broadcast program, the method comprising:

a step (a) of generating a record information file of a stored broadcast program including at least one sub-record information having a display level assigned thereto by a broadcast program unit stored in the at least one storage medium and storing the generated record information file in the corresponding storage medium, wherein the sub-record information includes user input information which is additional information directly inputted by a user; and a step (b) of if a slide show mode condition is inputted together with a record information browsing command, reading the sub-record information with the same display level as an inputted display mode and displaying the read sub-record information in a slide show type, the method further comprising displaying the record information of the record information file stored in the at least one storage medium based on the display level and with a currently played program on a screen.

23. The method of claim 22, wherein in the step (b), if the inputted display mode condition is a mode of '1', the record information is read from the record information file of the at least one storage medium to be displayed in a slide show type, wherein the record information is the sub-record information corresponding to the display level of '0' or '1', and wherein a slide show unit is the storage medium.

24. The method of claim 22, wherein in the step (b), if the inputted display mode condition is a mode of '2', the record information is read from the record information file of a selected one of the at least one storage medium to be displayed in a slide show type, wherein the record information is the sub-record information corresponding to the display level of '0', '1' or '2', and wherein a slide show unit is the broadcast program unit.

25. The method of claim 22, wherein the sub-record information includes at least one of a title, a record date, a record volume, a final play time, a thumbnail image and the user input information for the stored broadcast program and the display level assigned to the sub-record information.

* * * * *